(12) United States Patent
Caulier et al.

(10) Patent No.: US 9,049,915 B2
(45) Date of Patent: Jun. 9, 2015

(54) METHOD FOR MANUFACTURING A UNIT FOR APPLYING A COSMETIC PRODUCT

(75) Inventors: Eric Caulier, Maignelay (FR); Marine Roualdes, Paris (FR); Marcel Sanchez, Aulnay sous Bois (FR)

(73) Assignee: L'OREAL, Paris (FR)

(*) Notice: Subject to any disclaimer, the term of this patent is extended or adjusted under 35 U.S.C. 154(b) by 32 days.

(21) Appl. No.: 13/642,977

(22) PCT Filed: Apr. 20, 2011

(86) PCT No.: PCT/FR2011/050907
§ 371 (c)(1),
(2), (4) Date: Apr. 8, 2013

(87) PCT Pub. No.: WO2011/131907
PCT Pub. Date: Oct. 27, 2011

(65) Prior Publication Data
US 2013/0186426 A1 Jul. 25, 2013

Related U.S. Application Data

(60) Provisional application No. 61/328,754, filed on Apr. 28, 2010.

(30) Foreign Application Priority Data

Apr. 23, 2010 (FR) ..................................... 10 53097

(51) Int. Cl.
| | | |
|---|---|---|
| A45D 24/00 | (2006.01) | |
| A45D 40/26 | (2006.01) | |
| B29C 45/14 | (2006.01) | |
| B28B 7/22 | (2006.01) | |
| A45D 40/00 | (2006.01) | |
| A45D 2/48 | (2006.01) | |
| A45D 40/18 | (2006.01) | |
| A45D 40/24 | (2006.01) | |
| B29C 45/00 | (2006.01) | |

(52) U.S. Cl.
CPC ........ *A45D 40/00* (2013.01); *A45D 2/48* (2013.01); *A45D 40/18* (2013.01); *A45D 40/24* (2013.01); *A45D 40/26* (2013.01); *A45D 40/262* (2013.01); *A45D 2200/157* (2013.01); *B29C 45/0003* (2013.01)

(58) Field of Classification Search
CPC ....... A45D 40/00; A45D 40/26; A45D 40/18; A45D 40/24; A45D 20/262; A45D 2/48; A45D 2200/157; B29C 45/0003; B29C 45/16; B29C 70/78
USPC ......... 132/218, 200, 108, 109, 110, 111, 113, 132/114, 116, 162, 163, 220, 221, 317, 318, 132/320, 333, 297; 264/259, 478, 510, 524, 264/551, 266, 255; 424/70.6, 70.7, 64, 401, 424/412, 61; 401/49; 425/805, DIG. 32; 300/21
See application file for complete search history.

(56) References Cited

U.S. PATENT DOCUMENTS

| | | | | |
|---|---|---|---|---|
| 2,323,595 | A * | 7/1943 | Hanisch | 132/317 |
| 4,422,986 | A * | 12/1983 | Cole | 264/39 |
| 5,093,053 | A * | 3/1992 | Eckardt et al. | 264/45.1 |
| 5,316,712 | A | 5/1994 | Ono et al. | |
| 5,794,632 | A | 8/1998 | Gueret | |
| 5,803,097 | A * | 9/1998 | Gueret | 132/318 |
| 5,881,743 | A * | 3/1999 | Nadel | 132/320 |
| 6,343,887 | B1 * | 2/2002 | Dumler et al. | 401/129 |
| 6,591,842 | B2 * | 7/2003 | Gueret | 132/218 |
| 6,695,510 | B1 * | 2/2004 | Look et al. | 401/68 |
| 7,156,885 | B2 * | 1/2007 | Kennedy et al. | 8/405 |
| 7,390,184 | B2 * | 6/2008 | Keck et al. | 425/130 |
| 7,481,227 | B2 * | 1/2009 | De Laforcade | 132/218 |
| 7,637,265 | B2 * | 12/2009 | Funatsu et al. | 132/218 |
| 7,938,128 | B2 | 5/2011 | Guerett | |
| 8,336,560 | B2 * | 12/2012 | Dumler et al. | 132/218 |
| 8,414,813 | B2 * | 4/2013 | Jung et al. | 264/294 |
| 8,460,645 | B2 * | 6/2013 | Lezer et al. | 424/70.7 |
| 2001/0037815 | A1 * | 11/2001 | Gueret | 132/218 |
| 2002/0059942 | A1 * | 5/2002 | Neuner et al. | 132/218 |
| 2002/0101005 | A1 | 8/2002 | Bodmer et al. | |
| 2002/0181994 | A1 * | 12/2002 | Kuroiwa et al. | 401/55 |
| 2003/0156885 | A1 | 8/2003 | Lee | |
| 2005/0217691 | A1 * | 10/2005 | Petit | 132/320 |
| 2006/0070635 | A1 | 4/2006 | Dumler et al. | |

(Continued)

FOREIGN PATENT DOCUMENTS

| | | |
|---|---|---|
| CN | 1 293 839 | 1/2007 |
| EP | 1 955 610 | 8/2008 |

(Continued)

OTHER PUBLICATIONS

Written Opinion of the International Searching Authority for corresponding International Application PCT/FR2011/050907 (5 pages), dated Aug. 17, 2011.
English Translation of the Written Opinion of the International Searching Authority for corresponding International Application PCT/FR2011/050907 (5 pages), dated Aug. 17, 2011.
International Search Report for corresponding International Application PCT/FR2011/050907 (6 pages), dated Aug. 17, 2011.

(Continued)

*Primary Examiner* — Vanitha Elgart (74) *Attorney, Agent, or Firm* — The Marbury Law Group, PLLC (57) ABSTRACT

Disclosed herein is a method for producing a unit for applying a cosmetic product, the application unit comprising a support having a fixing site onto which a mass of cosmetic product is molded, the method comprising injection molding the cosmetic product onto the support. Also disclosed herein are application units obtained by such a method.

18 Claims, 6 Drawing Sheets

(56) References Cited

U.S. PATENT DOCUMENTS

| | | |
|---|---|---|
| 2006/0289027 A1* | 12/2006 | Wyatt et al. .................. 132/218 |
| 2007/0033759 A1* | 2/2007 | Dumler ........................... 15/187 |
| 2007/0034224 A1 | 2/2007 | Dumler |
| 2007/0104925 A1* | 5/2007 | Huber et al. .................. 428/192 |
| 2007/0196306 A1* | 8/2007 | Jager Lezer et al. ......... 424/70.7 |
| 2007/0256700 A1* | 11/2007 | Bodelin ......................... 132/218 |
| 2007/0286831 A1 | 12/2007 | Kamada et al. |
| 2008/0011317 A1* | 1/2008 | Malvar et al. ................. 132/218 |
| 2008/0073968 A1* | 3/2008 | Shiina ............................ 300/21 |
| 2008/0095566 A1* | 4/2008 | Thiebaut et al. ............... 401/52 |
| 2008/0149127 A1* | 6/2008 | Rebours ........................ 132/218 |
| 2008/0236608 A1* | 10/2008 | Tranchant et al. ............ 132/218 |
| 2009/0045089 A1 | 2/2009 | Sheppard et al. |
| 2009/0065018 A1* | 3/2009 | Berhault ....................... 132/218 |
| 2009/0065020 A1* | 3/2009 | Butcher et al. ............... 132/218 |
| 2009/0095317 A1* | 4/2009 | Poetschl et al. .............. 132/320 |
| 2009/0160100 A1* | 6/2009 | Wu et al. ....................... 264/478 |
| 2009/0293900 A1* | 12/2009 | Holloway et al. ............ 132/218 |
| 2010/0037911 A1 | 2/2010 | Kim |
| 2010/0242984 A1* | 9/2010 | Arditty et al. ................ 132/218 |
| 2010/0307529 A1* | 12/2010 | Schwab et al. ............... 132/218 |
| 2012/0266910 A1* | 10/2012 | Tarling et al. ................ 132/318 |
| 2013/0206160 A1* | 8/2013 | Sanchez et al. .............. 132/218 |

FOREIGN PATENT DOCUMENTS

| | | |
|---|---|---|
| JP | 2005177233 | 7/2005 |
| JP | 2006115871 | 5/2006 |
| KR | 20090005369 | 6/2009 |
| WO | WO 9108692 A * | 6/1991 |
| WO | 2004103676 | 12/2004 |
| WO | 2006043544 | 4/2006 |
| WO | 2006057071 | 6/2006 |
| WO | 2009062947 | 5/2009 |
| WO | 2011131554 | 10/2011 |

OTHER PUBLICATIONS

Written Opinion of the International Searching Authority for International Application PCT/EP2011/055900 (5 pages), dated Jun. 8, 2011.

International Search Report for International Application PCT/EP2011/055900 (3 pages), dated Jun. 8, 2011.

* cited by examiner

METHOD FOR MANUFACTURING A UNIT FOR APPLYING A COSMETIC PRODUCT

CROSS-REFERENCE TO RELATED APPLICATIONS

This is a national stage application of PCT/FR2011/050907, filed internationally on Apr. 20, 2011, which claims the benefit of U.S. Provisional Application No. 61/328,754, filed on Apr. 28, 2010, and claims priority to French Application No. 1053097, filed Apr. 23, 2010.

FIELD OF THE DISCLOSURE

The subject of the present invention is an application unit for an applicator for applying cosmetic product to human keratin materials, in particular the skin, the lips, the eyelashes or the eyebrows. The invention also relates to a method for producing said application unit.

BACKGROUND

The expression "cosmetic product" is understood to mean any composition as defined in Council Directive 93/35/EEC of 14 Jun. 1993.

Application EP 1 955 610 discloses an applicator end piece which is composed exclusively of a composition for making up the eyelashes, is molded and can be mounted by being push-fitted onto a heating support in the form of a finger. However, such an end piece composed of cosmetic product mounted directly on the heating support soils this support, which has to be cleaned following each use. In addition, in order to be able to be push-fitted onto the support, the product necessarily has to extend around the entire perimeter of the applicator end piece. In addition, handling end pieces composed only of a makeup composition can lead to soiling of the user's fingers. Application US 2007/0286831 discloses a mascara applicator comprising a heating member surmounted by a comb, in which the product is present in the form of bars or beads deposited on the heating member while the latter is in a housing. Feeding means comprising a piston, a cylinder or an endless screw are provided to move the product onto the heating member. The product is not directly supplied with the comb but requires a complex distributor having numerous mechanical parts, and this can hamper reliability and/or lead to the product becoming loaded with undesirable particles.

PCT Application WO 2006/043544 discloses a device for applying a cosmetic product, comprising a removable unit mounted on a receiving region of a base that faces a heating member and receives the product in the form a block to be placed on the unit by the user and then to be melted by virtue of the heating member. However, the product is not directly supplied in a manner integrated with the unit, and the handling of the blocks can therefore lead to soiling of the user's fingers.

Document U.S. Pat. No. 5,794,632 discloses a device for applying a cosmetic product, comprising a support on which there is fixed a block of cosmetic product. However, the product is molded by being poured onto the support, this manufacturing method being well known in the field of cosmetics and requiring the separate production of the support in order subsequently to mold the product onto said support by pouring, this resulting in a complex manufacturing process with poor output.

Application U.S. Pat. No. 5,316,712 also discloses a method for manufacturing a solid cosmetic product that is obtained mainly from a powder and an oil and is injection-molded for example onto a container such as a dish. However, in this method, it is necessary to place the dishes in the mold beforehand, and this results in an increase in the manufacturing time and a risk of the dishes being poorly positioned, which can hamper the reliability of the manufacturing process.

There is a need to make possible simple manufacturing of a device for applying cosmetic product to human keratin materials, allowing the cosmetic product to be applied in a manner which is relatively simple, relatively reliable, hygienic and practical to use.

SUMMARY

The object of the invention is thus to provide a unit for applying a cosmetic composition and a method for producing this application unit in order to remedy the abovementioned drawbacks.

To this end, the invention provides a method for producing a unit for applying a cosmetic product, the application unit comprising a support having a fixing site onto which there is molded a mass of cosmetic product, the cosmetic product being injection-molded onto the support.

The invention advantageously makes it possible to obtain application units loaded beforehand with product, without the user intervening with the product as such, which can reduce the risks of soiling or of contamination of the product. In addition, these application units are simple to produce industrially.

According to other features of the invention, the method may comprise the following steps: a first injection of a first material into a first injection volume is carried out to form the support, the first injection volume being defined in an injection mold; a partial modification of the mold is carried out to obtain a second injection volume while retaining the support injected in the preceding step; a second injection of cosmetic product into the second injection volume is carried out, the composition of the cosmetic product being different than the first material that forms the support.

This method advantageously makes it possible to obtain an improved manufacturing output of application units, while ensuring good quality and good reproducibility of the loading with cosmetic product.

The injection temperature of the cosmetic composition is lower than the injection temperature of the support.

The method may include a third injection of a second cosmetic composition into a third injection volume formed following partial modification of the mold that forms the second volume, and including the support loaded with first cosmetic composition which remained in the mold following the second injection.

The invention also relates to an application unit obtained by this method, the melting point of the cosmetic product being greater than 30° C. and less than the melting point of the material that forms the support, the melting point of the material that forms the support being greater than 100° C.

The fixing site may comprise application elements or at least two receiving compartments that are separated from one another by ribs. This feature makes it possible in particular to obtain a better hold of the product on the support.

The support may comprise a gripping member that makes it possible to use the application unit directly as a cosmetic product applicator.

The support may also be designed to be fixed to a receiving region of an applicator.

BRIEF DESCRIPTION OF THE DRAWINGS

The invention will be understood better from reading the following description of non-limiting examples of the implementation thereof with reference to the appended drawings, in which:

FIGS. 22 to 27 illustrate the various steps in the method for manufacturing application units of the invention.

DESCRIPTION OF EXEMPLARY EMBODIMENTS

Figure 1:
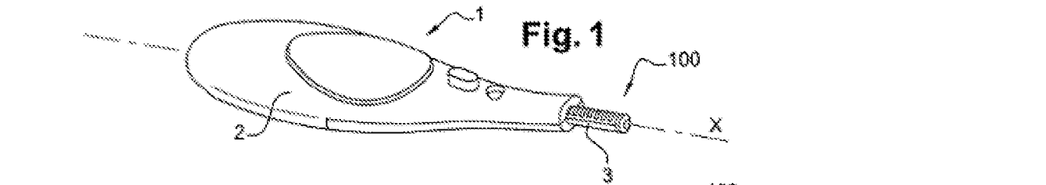
FIG. 1 schematically shows an applicator comprising an application unit according to the invention.

With reference to the figures, in particular to FIG. 1, an applicator 1 according to a first implementation example comprises a base 2 that extends mainly along a longitudinal axis X and an electric heating element 3. An application unit 100 is mounted in a removable manner on the base 2 in a receiving region on the electric heating element 3. In the example described, the receiving region extends parallel to the longitudinal axis X, but this does not have to be the case.

The applicator 1 comprises in particular an autonomous energy source, for example an electric battery, for supplying power to the electric heating element 3 intended to transmit its heat to the application unit 100.

The electric heating element 3 can be produced in various ways, and may comprise a resistive electrical conductor which is coiled or in track form, for example one which is flexible.

Generally, the electric heating element 3 has for example a nominal power of between 0.5 and 2 W, for example around 0.8 W, and makes it possible to reach a temperature of greater than 50° C., for example a temperature of 70° C. for an ambient temperature of 20° C.

This electric heating element 3 can comprise a metal covering made, for example, of stainless steel or anodized aluminum, thus defining the receiving region facing at least a part of the application unit 100 when the latter is fixed in the receiving region.

The metal covering is for example approximately cylindrical, extends from the base 2 of the applicator parallel to the axis X and is designed to receive the application unit 100. The metal covering is for example open at its end distal from the base 2 of the applicator so as to define a suitable cavity for receiving a lug 36 on the application unit 100 when the latter is mounted on the receiving region.

Figures 4, 5, 6, 7, 7A, 8, 8A:
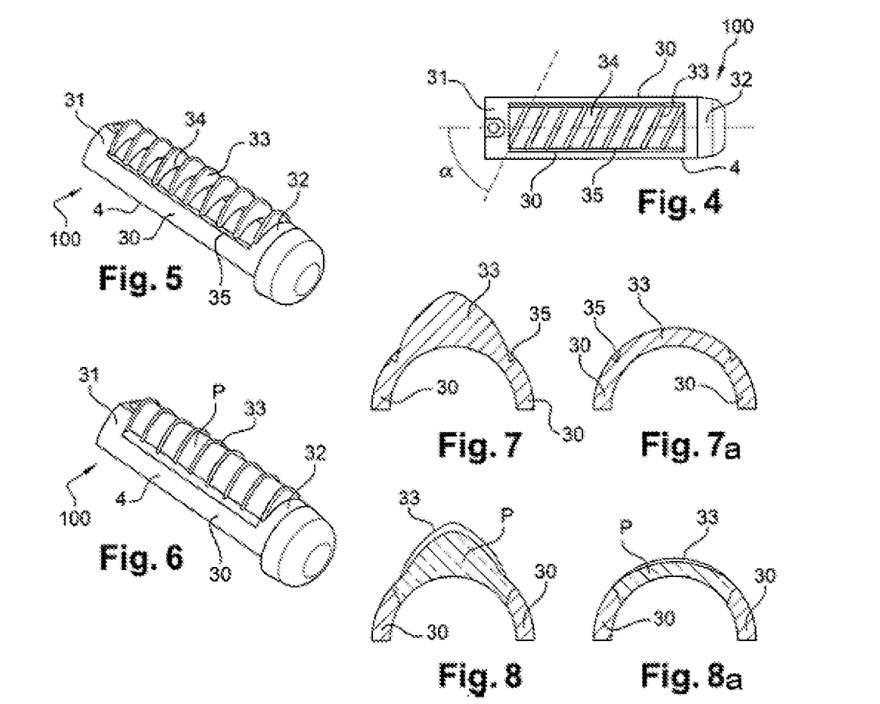
FIG. 4 is a second variant of the application unit from FIG. 2.
FIG. 5 is a perspective view of the application unit from FIG. 2.
FIG. 6 is a view of the application unit from FIG. 5 loaded with cosmetic product.
FIG. 7 is a cross-sectional view along VII-VII of the application unit from FIG. 2 without cosmetic product.
FIG. 8 is a cross-sectional view along VIII-VIII of the application unit from FIG. 2 loaded with cosmetic product.
FIGS. 7a and 8a are cross-sectional views similar to FIGS. 7 and 8 with ribs that do not extend radially.

FIGS. 2 to 6 show, in isolation, application units 100 in an intermediate manufacturing stage, without product in FIGS. 2 to 5 and loaded with product in FIG. 6. These application units 100 are suitable for an applicator according to the first implementation example described above but their features can be adapted to application units that are suitable for other types of applicators, such as the applicator 1' described below according to another implementation example.

Figure 13:
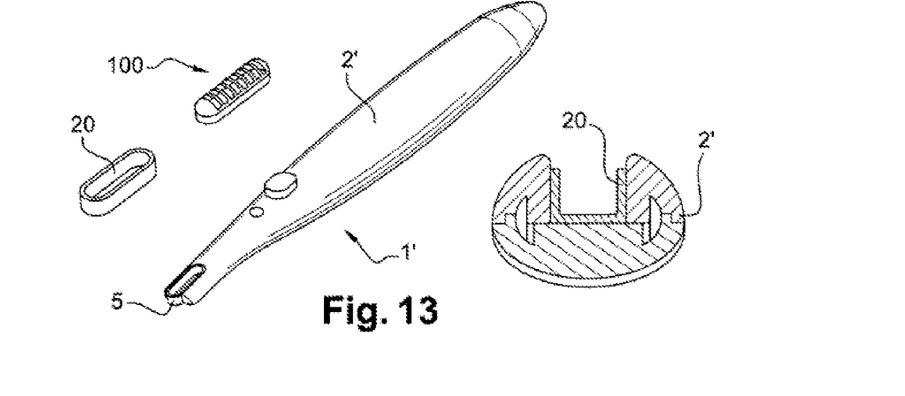
FIG. 13 shows schematic views of another implementation example of the applicator.
Figure 14:
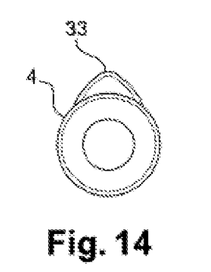
FIGS. 14 to 20 show different variants of application unit profiles and also different cosmetic product loading patterns, FIG. 21 schematically shows a machine for manufacturing application units of the invention.

An application unit 100 comprises a support 4 suitable for the positioning and removable fixing of the application unit on the receiving region of the applicator 1. In addition, the removable fixing of the support 4 on the receiving region makes it possible to easily change product, the applicator 1 then remaining clean and able to receive a new application unit 100. The removable fixing is achieved by snap-fastening, as illustrated in FIG. 13, by push-fitting, by tightly fitting or by any other means of removable mounting, such as for example with the aid of a lug 36 which is able to be received in a cavity in the applicator as is shown in particular in FIG. 9.

Thus, the support 4 can extend along a longitudinal axis Y, which may be parallel to the longitudinal axis X of the base 2 of the applicator 1 when the application unit is mounted on the latter.

The support 4 may comprise, as illustrated, a frame having two lateral arms 30 that are connected together at their proximal and distal ends and by the proximal part 31 and distal part 32 of the support 4. The frame thus forms a compartment that is able to receive a cosmetic product.

Figure 9:
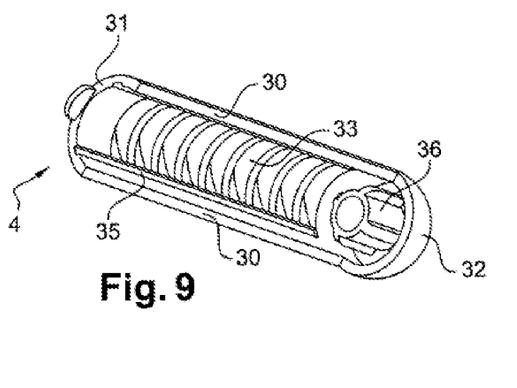
FIGS. 9 and 10 are perspective views of a variant embodiment of the application unit with and without cosmetic product, respectively.

As is illustrated in FIG. 7, each of the arms 30 and the proximal part 31 and distal part 32 of the support 4 can have an internal profile complementary to the receiving region of the applicator and in particular to the electric heating element 3. For example, the internal profile is in the form of a circular arc so as to fit over a cylindrical receiving region. Thus, the inner face of the support 4, that is to say the face opposite the heating element 3 or its metal covering, forms a shell that extends over a whole revolution or over less than a revolution around the axis Y, for example so as to form a half-cylinder. Furthermore, as illustrated in FIG. 9, a lug 36 can be provided at the distal end of the support 4, it being possible for this lug to be inserted into a cavity in the receiving region provided in the heating element 3 in order to hold the support 4 on the receiving region in a more precise manner.

Figure 2:
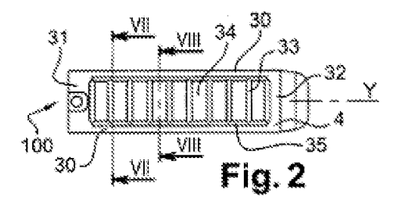
FIG. 2 is a top view of the application unit from FIG. 1 on its own without cosmetic product.
Figure 3:
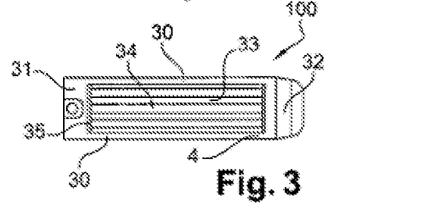
FIG. 3 is a first variant of the application unit from FIG. 2.

The support 4 can be designed to exert a combing action in particular on the eyelashes. Thus, the support 4 can comprise mutually parallel ribs 33. The ribs 33 can be oriented transversely to the axis Y, as illustrated in FIGS. 2, 5 and 6, or otherwise, for example forming an angle a with the axis Y of, for example, 45°, as in FIG. 4, or can even be oriented parallel to the axis Y, as in FIG. 3. It is also possible for the ribs 33 not to be parallel to one another. The ribs 33 can connect the lateral arms 30 on the external side of the application unit 100, that is to say on the side opposite the heating element 3, when the application unit 100 is in place on the receiving region. The base of the ribs 33 thus has a profile in the form of a circular arc in line with the profile in the form of a circular arc of the arms 30, in order to be positioned in contact with the cylindrical receiving region.

The ribs 33 divide the frame into a plurality of compartments 34 that are suitable for receiving a cosmetic product. For example, in the case of ribs 33 oriented transversely to the axis Y, the support may comprise between two and fifteen ribs. The spacing between two adjacent ribs is for example between 0.2 and 1.2 mm.

Preferably, an application unit 100 can have a largest dimension along the axis Y of less than 30 mm, or even than 20 mm. The frame is divided into an odd number of compartments, for example a frame with a length of around 12 mm along the axis Y is divided into 9 compartments of around 1 mm along the axis Y by 8 ribs 33 that are transverse to the axis Y and less than 0.4 mm thick. These 8 ribs 33 can be supplemented by two end ribs on the proximal part 31 and distal part 32 of the support 4 in order that the first and last compartments 34 are identical to the others.

The ribs 33 can extend radially away from the support 4; for example the ribs 33 can have a height of 1 mm above the axis comprising the tops of the proximal part 31 and distal part 32. The ribs 33 illustrated have an identical height but can also have heights that vary from one end of the support to the other, in particular passing through a minimum half way along the support.

The ribs 33 can also have different types of profiles, for example rounded, triangular or, as illustrated, in the form of a pointed arch.

Furthermore, the ribs 33 can define a resting region that allows a user to more easily remove the support from the receiving region, for example by sliding it on the base, without the user's fingers coming into contact with the cosmetic product P.

It is also possible for the ribs 33 not to extend radially away from the support 4, as in the example shown in FIGS. 7a and 8a.

One or more grooves 35 can connect the various compartments 34 together. These grooves 35 can be located on the outer face of the support 4, that is to say on the face opposite the heating element. These grooves 35 are for example located along an edge of the frame, in particular along one or more arms 30, as in FIGS. 2 and 4 to 6, or along one or both of the proximal part 31 and distal part 32 of the support 4, as in FIG. 3.

Figure 10:
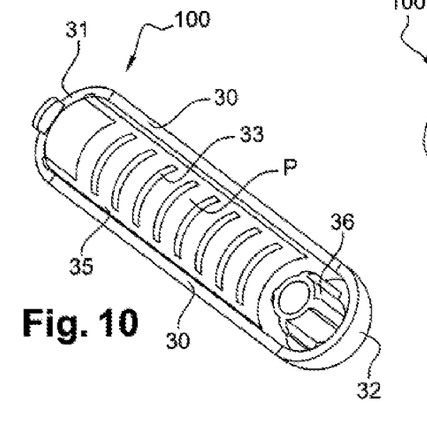
Figure 11:
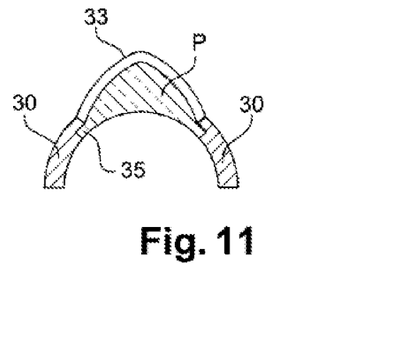
FIG. 11 is a cross-sectional view of the application unit from FIG. 9.

According to a variant embodiment, an application unit 100 is shown in FIGS. 9 and 10, respectively without and loaded with cosmetic product P. This variant differs from the application unit described above with reference to FIGS. 2 to 6 in that the groove or grooves 35 connecting the various compartments 34 together is or are located on the inner face, that is to say facing the heating element 3 or its metal covering, and extends or extend on an edge of the frame along one or more arms 30.

In all of the variants of the application unit 100, the groove or grooves 35 can only extend over a portion of the support so as only to connect some successive compartments. Thus, one or more first grooves can connect the first compartments 34 proximal to the application unit with respect to the base 2 of the applicator, and one or more second grooves can then connect the other compartments 34.

In the examples illustrated, the bottom of the support 4 is perforated, but it can be solid according to other variants. A perforated bottom allows direct transmission of the heat from the heating element 3 to the product P, and thus makes it possible to reach the application temperature more quickly.

The support 4 is, for example, made of plastics material, in particular of a polyolefin, such as polyethylene (PE) or polypropylene (PP) or, alternatively, of nonpolyolefinic materials, such as styrene/acrylonitrile (SAM), acrylonitrile/butadiene/styrene (ABS) or polyoxymethylene (POM). These plastics materials can optionally comprise, as fillers, inorganic particles or fibers, for example of metal oxides, of powder or fiber of glass or carbon black, in order for example to improve and/or control the transfer of heat in the support 4 to the product, and/or to improve the rigidity of the support 4.

Alternatively, the support 4 can be made of metal, for example of aluminum, brass, silver or stainless steel.

The support 4 is produced by injection-molding. The injection-molding process will be described below in the description.

A description has been given of variants of the support 4 comprising a single frame forming a compartment that is able to receive a cosmetic product, but variants of the application unit illustrated in FIGS. 17 to 20 can comprise a plurality of frames. These supports 4 can have the same features as the above supports, such as ribs 33 and/or grooves 35, for example.

Figure 17:
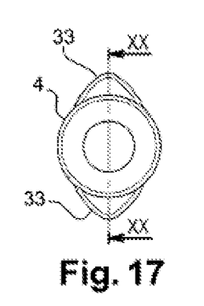
Figure 20:
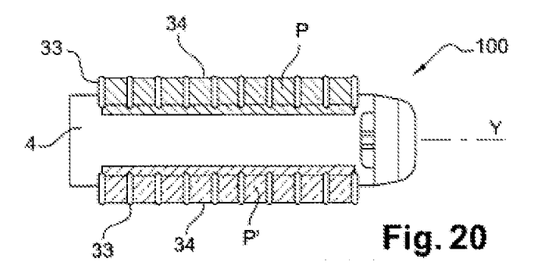

Thus, with reference to FIGS. 17 and 20, when the support 4 extends over more than half a revolution about the axis Y, two opposite frames with respect to the axis Y can be present on the support 4.

Figure 18:
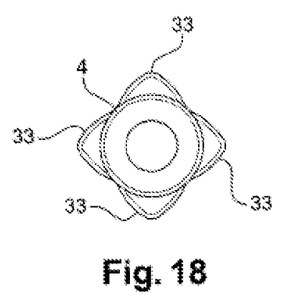

With reference to FIG. 18, the support 4 extends over one revolution about the axis Y, and four frames, for example positioned every 90° with respect to the axis Y, can be present on the support 4.

Figure 19:
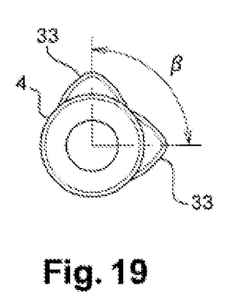

With reference to FIG. 19, the support 4 extends over less than one revolution or over one complete revolution about the axis Y, and two frames, offset by an angle β of for example less than 90°, for example equal to 70°, with respect to the axis Y, can be present on the support 4.

FIG. 13 shows an applicator 1' according to another implementation example, having an application unit adapted to this applicator F.

The application unit 100 can be received in a dish 20. The latter is made, for example, of thermoplastic material, but may also be metallic, in order to promote the transfer of heat from the heating element (not shown) to the application unit 100. The dish 20 can be useful for reducing the risk of product flowing out of the applicator during heating. The dish 20 can be hollowed out or have a closed bottom.

The dish 20 can be fixed in a removable manner in the receiving region 5 of the applicator 1', so as to allow it to be removed, for example in order to replace it or to change the application unit. The dish 20 can also be integrated into the base of the applicator. The dish 20 can also be part of the application unit 100.

The application unit 100 can be clipped into the dish 20 or simply be mounted by push-fitting into the dish 20.

Such an applicator is suitable for example for applying a product to the lips or the skin.

Figure 12:
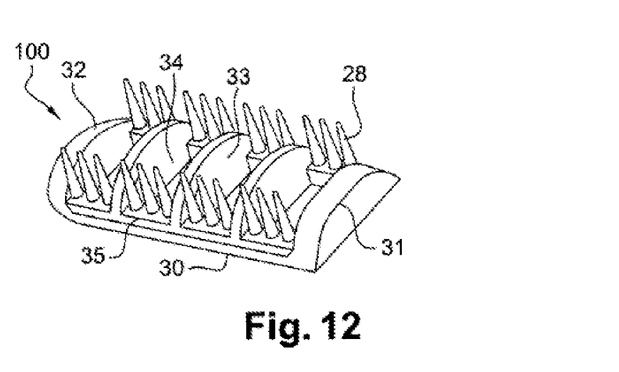
FIG. 12 is a perspective view of a variant of the application unit.

The support 4 can also, as shown in FIG. 12, comprise protruding application elements 28. In the case of application to the eyelashes, the application elements 28 can be useful for separating the eyelashes to which product has been applied and to define means for combing the eyelashes.

The application elements 28 can be disposed on the arms 30 of the support 4; for example the application elements 28 can extend in two rows parallel to the longitudinal axis Y of the support 4, each of said rows being disposed on an arm 30 of the support 4.

When the support 4 is made of thermoplastic material, the application elements 28 can be made in one piece with the rest of the support 4 or, alternatively, be connected thereto.

In the example shown, the application elements 28 are teeth that extend between the ribs 33. An identical number of application elements 28 is for example disposed between two adjacent ribs 33.

The application elements 28 can be disposed in rows parallel to the axis Y and project above the ribs 33.

The cosmetic product P, also called cosmetic composition, can extend, as illustrated in FIGS. 6, 7, 9 and 10, in the frame of the support 4 formed by the two lateral arms 30 that are connected together at their proximal and distal ends. Thus, the product P extends over less than one revolution about the axis Y of the support 4, resting via an inner face, opposite the application face, against the bottom of the support 4, which is positioned facing the electric heating element 3 when the application unit 100 is in place on the base 2. The product P thus extends only over a portion of the metal element covering the heating element, thus preventing soiling of the entire surface of the metal element.

When the support 4 comprises ribs 33, the product P does not extend above the ribs 33. Preferably, the product P is at least partially set back from the upper end of said ribs 33, allowing a user to take hold of the application unit 100 without his or her fingers coming into contact with the cosmetic product P and thus preventing the fingers from being soiled.

The support 4 carries for example between 10 and 100 mg of product, for example between 20 and 50 mg of product, for example around 30 mg. This quantity is, for example, suitable for a single use. When the product is of the mascara type, for example, the quantity of product makes it possible to apply makeup to one or two rows of eyelashes. Mascara is understood to be a composition intended to be applied to the keratin fibers.

The product may be cold-applicable. For example, the product may be a makeup product such as a lipstick, a mascara, an eyeshadow or a kohl. The product may also be a body hygiene product such as a soap or a deodorant. The product may also be a hair product such as a styling gel, a wax or a haircare product.

The cosmetic product P is for example an eyelash makeup composition which has a property that varies depending on the temperature, for example a threading nature.

It is for example a composition comprising at least one reversible polymer that is solid at room temperature. The term "solid" designates a product which does not flow under the effect of gravity at 20° C.

The composition may comprise at least one compound selected from:
  polymers and copolymers comprising at least one alkene monomer, in particular ethylene-based copolymers,
  poly(vinyl acetate) homopolymers,
  silicone resins,
  film-forming block ethylenic polymers, which preferably comprise at least a first block and at least a second block with different glass transition temperatures (Tg), said first and second blocks being linked together via an intermediate block comprising at least one constituent monomer of the first block and at least one constituent monomer of the second block,
  copolymers of dienes and of styrene,
  sulfopolyesters,
  copolymers of alkene and of vinyl acetate, in particular copolymers of ethylene and of vinyl acetate,
  copolymers of ethylene and of octene,
  poly(vinyl acetate) homopolymers,
  T silicone resins, such as polyphenylsiloxanes,
  film-forming block ethylenic copolymers resulting essentially from monomers selected from alkyl methacrylates, alkyl acrylates and mixtures thereof,
  copolymers of butadiene and of styrene,
  copolymers obtained by condensation of diethylene glycol, cyclohexanedimethanol, isophthalic acid, sulfoisophthalic acid and mixtures thereof.

The threading nature can in particular be of dmax ≥5 mm, being determined in particular according to the protocol described in paragraphs [0120] to [0127] of Application EP 1 955 610.

The product P is for example solid at 20° C. and has a hot threading nature at a temperature greater than 30° C., for example at a temperature of between 30° C. and 80° C., preferably between 40° C. and 70° C. The electric heating element thus has the role of bringing the product to a high enough temperature to cause it to melt and allow the formation of threads of product, in particular at the end of the eyelashes.

It is possible for the product not to have a hot threading nature; for example the heating of the product may also increase the adhesion of the product to the eyelashes in order to make it easier to obtain a deposition having greater brilliance or else to allow the use of compounds which are not suitable for cold application.

The product may have a melting point greater than or equal to 50° C., for example close to 54° C.

The product is for example chosen to be able to be heated several times to a temperature of at least 90° C. without being damaged.

The product described in this example is of the mascara type for application to the eyelashes, but alternatively, the product may be intended for application to the lips, the nails or may otherwise be a skin makeup product, for example a foundation; in these other applications, it is possible for the support 4 not to have ribs 33.

The product P is loaded onto the support 4 by injection-molding. The injection-molding process will be described below in the description.

Figure 15:
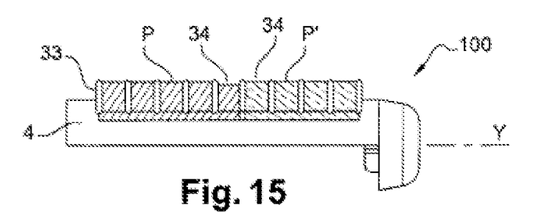
Figure 16:
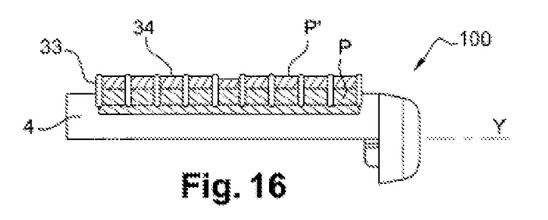

In variant embodiments illustrated in FIGS. 15, 16 and 20, an application unit 100 may comprise a plurality of cosmetic products P, P'.

The different products are for example different colors or have different properties. The different products proposed can for example result in makeup effects which are more or less full-bodied, and more or less lengthening.

Thus, as shown in FIG. 15, at least two compartments 34 comprise a different cosmetic product. The support 4 of the application unit 100 comprises a frame having a row of compartments 34. A first, proximal series of compartments 34 with respect to the base 2 of the applicator comprises a first product P, for example having a first color and/or a specific threading nature. A second, distal series of compartments 34 with respect to the base 2 of the applicator comprises a second product P', for example having a second color and/or a different threading nature. In this way, in the case of products to be applied to the eyelashes, the user can obtain a row of eyelashes having portions with two different colors and/or with lengthening of different lengths.

According to a variant shown in FIG. 16, at least one compartment 34 comprises two different cosmetic compositions P, P' stacked one on top of the other. The support 4 of the application unit 100 comprises a frame having a row of compartments 34. The bottom of the compartments 34 comprises a first product P. A second product P' is positioned above the first product P. In this way, the heating of the two products can cause them to melt and makes it possible to obtain a mixture composed of the two products. Thus, an extemporaneous mixture of two independently stable products P, P' can be obtained.

According to another variant shown in FIG. 20, in the case of a support 4 comprising two rows of compartments 34, each of these rows comprises a different cosmetic composition P, P'. For example, the first composition P may be a makeup base for keratin fibers or else a composition for the cosmetic treatment of the keratin fibers, and the second composition P' may be makeup for the keratin fibers or a composition to be applied to a mascara. Such compositions are described in particular in Application WO2009062947. In this way, the user can first of all apply the first product P for preparing the eyelashes and then the second product P' for making up the eyelashes.

FIGS. 28 to 33 show variant application units 100 that can for example be used alone as an applicator without needing to be fixed to an applicator comprising a receiving region for the unit 100.

Figures 28, 29, 30, 31:
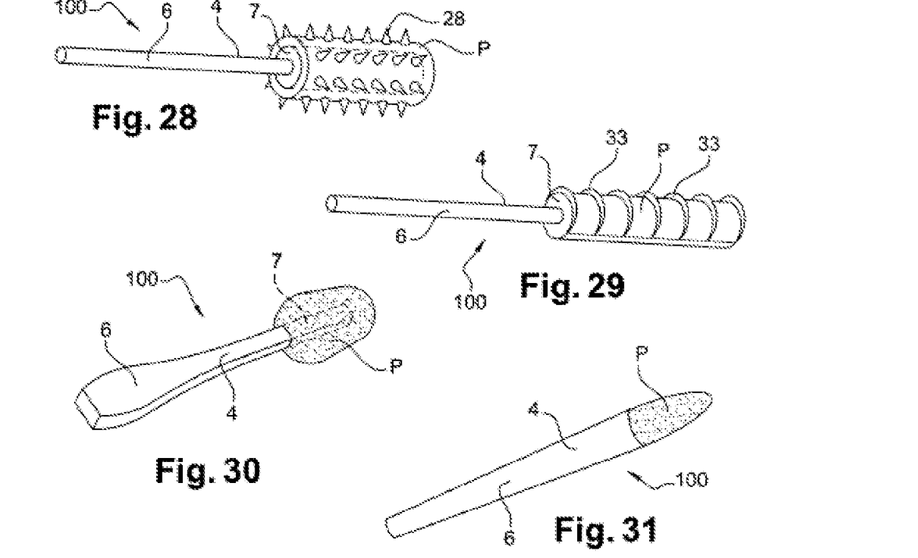
FIGS. 28 to 41 show variants of application units according to the invention.

With reference to FIG. 28, the support 4 comprises a gripping member 6 for the user. The gripping member 6 may have any shape suitable for gripping by the user and, in some embodiments, may be shaped as a wand. One end of the gripping member 6 comprises a cylindrical fixing site 7 for the cosmetic product P, comprising application elements 28 extending radially from the fixing site 7. The product P is injection-molded onto the fixing site 7, the free end of the application elements 28 protruding beyond the block of product P injected in this way. Such an application unit 100 can thus form an applicator of the mascara-brush type. The application elements 28 allow for example a better hold of the product P on the support 4 and also make it possible to separate the eyelashes better during the application of the product P.

With reference to FIG. 29, the application unit 100 comprises a support 4 that has a gripping member 6 for the user. The gripping member 6 may have any shape suitable for gripping by the user and, in various embodiments, may be shaped as a wand. One end of the gripping member 6 comprises a fixing site 7 that extends substantially in a plane so as to form a plate. Application ribs 33 extend transversely on the plate of the fixing site 7 for the cosmetic product P. The product P is injection-molded onto the fixing site 7, the free end of the application ribs 33 protruding beyond the block of product P injected in this way. Such an application unit 100 can thus form an applicator of the mascara-comb type. The ribs 33 allow for example a better hold of the product P on the support 4 and also make it possible to separate the eyelashes better during the application of the product.

With reference to FIG. 30, the application unit 100 comprises a support 4 that has a gripping member 6 for the user. The gripping member 6 may have any shape suitable for gripping by the user and, in certain embodiments, may be shaped as a handle. One end of the gripping member 6 forms a fixing site 7 for example in the form of a blade. This end of the gripping member has a smaller thickness than the gripping member in order to confer flexibility on the fixing site with respect to the gripping member, which remains rigid during application. This flexible end will allow the user to have the sensation of a flexible end piece such as a foam end piece, for example. The product P is injection-molded all around the fixing site 7. Such an application unit 100 can thus form an applicator of the eyeshadow type.

Figure 32:
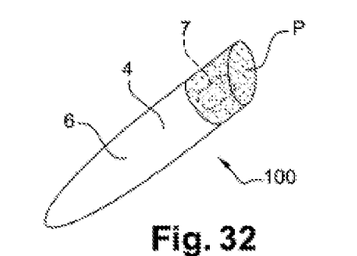

With reference to FIGS. 31 and 32, the application unit 100 comprises a support 4 that has a gripping member 6 for the user. The gripping member 6 may have any shape suitable for gripping by the user and, in some non-limiting embodiments, may be shaped as a handle which is approximately cylindrical. A boss extends from an end face of the gripping member, this boss forming a fixing site 7. The product P is injection-molded all around the boss that forms the fixing site 7. The injected product P can then be flush with the edge of the end face of the gripping member 6. The block of product formed after injection can assume any shape suitable for the type of application desired. For example, the application unit in FIG. 31 comprises a block of product in the form of an ogive, thus forming an applicator of the kohl type, while the application unit in FIG. 32 comprises a block having a beveled face, thus forming a lipstick applicator.

Figure 33:
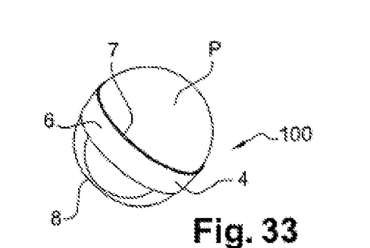

With reference to FIG. 33, the application unit 100 comprises a support 4 having a gripping member 6 for the user. The gripping member may have any shape suitable for gripping by the user and, in various embodiments, may comprise a substantially circular mounting plate having one side from which there extends a hoop 8 for gripping the support 4. The other face of the gripping member forms the fixing site 7 for the product P, which is injection-molded onto this face. The injected product P can thus be flush with the edge of the face of the gripping member 6 and have a hemispherical shape in this example, but can also assume any shape suitable for the type of application desired. Spikes, which are not shown, can be disposed on the face of the gripping member that forms the fixing site 7. The cosmetic product P can be a hygiene product of the soap or deodorant type. The spikes allow for example a better hold of the product on the support and can also make it possible to massage the application surface or else to improve the foaming effect of the cosmetic product in the case of a soap.

Figure 34:
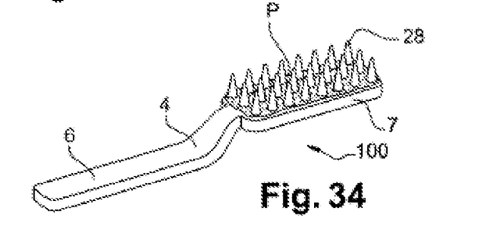

With reference to FIG. 34, the application unit 100 comprises a support 4 that has a gripping member 6 for the user. The gripping member may have any shape suitable for gripping by the user and, in certain embodiments, may be shaped as a handle. One end of the gripping member comprises a fixing site 7 that extends substantially in a plane so as to form a plate. Application elements 28 extend perpendicularly away from the plate so as to form a comb or hair brush. The product P is injection-molded onto the fixing site 7 between the application elements 28, the free end of said application elements 28 protruding beyond the block of product P injected in this way. The product injected may be a styling gel, a haircare product or a wax. The application elements allow for example a better hold of the product P on the support 4 and also make it possible to comb the hair better during the application of the product.

FIGS. 35 to 39 show sectional views of the fixing site 7 with injection-molding variants of the product. These fixing sites 7 are for example located at the end of a gripping member 6 of the support 4, which may be shaped, in some embodiments, as a wand, as in the example of FIG. 28.

Figure 35:
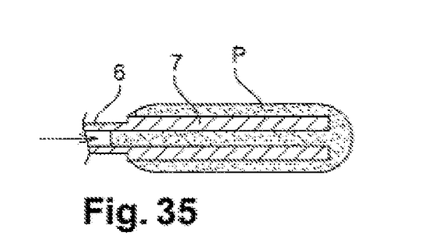

With reference to FIG. 35, the gripping member 6 for the user may be shaped, in various non-limiting embodiments, as a tubular wand. The product P is injection-molded onto the fixing site 7, which is likewise tubular, through the inside of the gripping member 6 through an injection point represented by the arrow. The product P positioned both in and around the end of the gripping member 6 allows for example a better hold of the mass of product P on the support 4.

Figure 36:
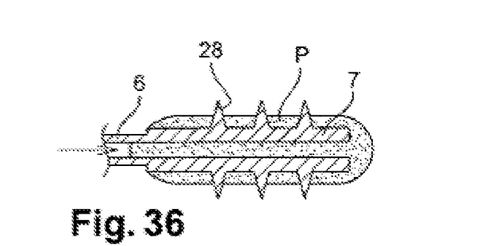

With reference to FIG. 36, the fixing site 7 and the molding method are similar to those in FIG. 35, the fixing site 7 also comprising application elements 28 that protrude beyond the block of product P injected in this way, as in the application unit of FIG. 28. The hold of the product on the support is thus further improved.

Figure 37:
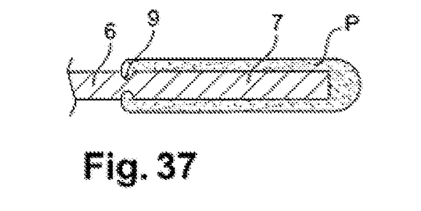

With reference to FIG. 37, the support 4 forms a gripping member 6 for the user that comprises an end that forms a fixing site 7 of the product. The gripping member 6 may be shaped, in some embodiments, as a wand, and may comprise an annular groove 9 positioned approximately between the gripping portion of the application unit and the fixing site 7. The product P is injection-molded all around the fixing site 7 and around the annular groove 9, thereby allowing a better axial hold of the 25 mass of product on the support.

Figure 38:
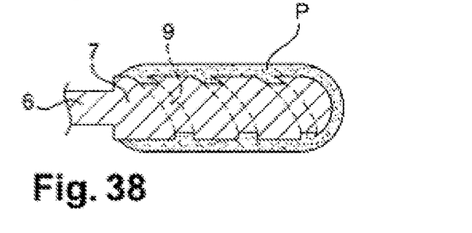

With reference to FIG. 38, the application unit is similar to that of FIG. 37, but the groove 9 is helical, extending along the surface of the fixing site 7.

Figure 39:
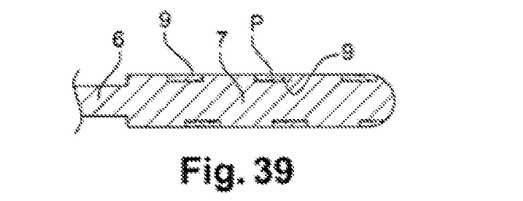

With reference to FIG. 39, the cylindrical fixing site 7 comprises a plurality of annular grooves 9, the product P being injected only into these annular grooves 9.

Figure 40:
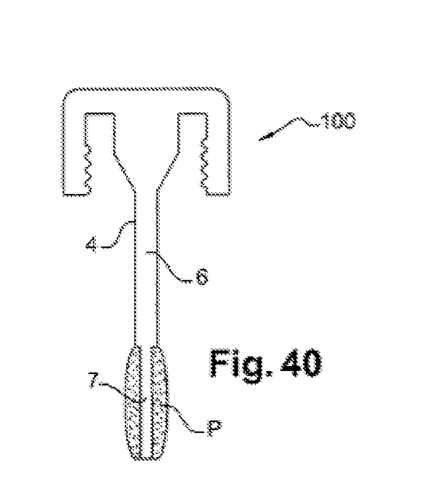

With reference to FIG. 40, the application unit 100 comprises a support 4 having a gripping member 6, which may, in certain embodiments, be shaped as a wand, a first end of which comprises a fixing site 7 onto which the product is injection-molded. The second end of the gripping member 6 comprises a socket for screwing for example onto a container, not shown, such that the application unit 100 can be stored in said container. In this example, the socket serves as a gripping member for the user.

Figure 41:
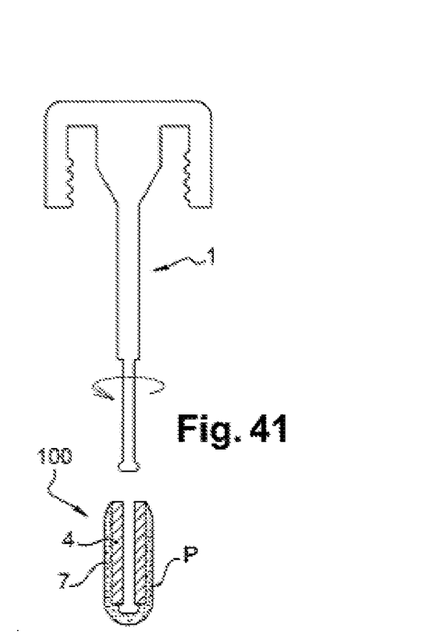

With reference to FIG. 41, the application unit 100 is formed by a support 4 in the form of a sleeve, around which the product is injected, the fixing site 7 then being the external surface of the sleeve. This application unit 100 is designed to be push-fitted onto an applicator 1 comprising a wand to which the sleeve is fixed. Once it is fixed, the sleeve can be immobile with respect to the wand or able to rotate about the shaft of the wand. The shaft of the wand can be connected to an element that emits vibrations in the wand and/or to a motor that allows the wand to be set into rotation about its axis.

The method of manufacturing and loading the support 4 with product P by injection-molding will now be described with reference to FIGS. 21 to 27. Injection-molding is understood to be molding of a component by injecting a material in the fluid state under superatmospheric pressure into a volume which is closed apart from the injection orifice defined by the mold.

Figures 21, 22, 23:
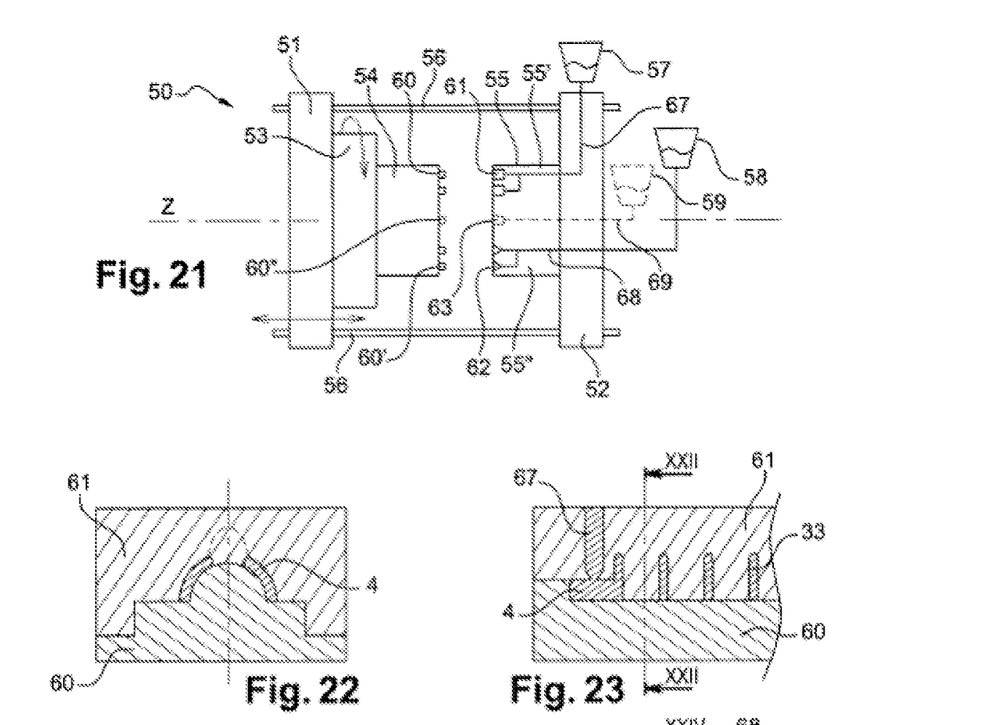

An injection-molding press 50 is shown schematically in FIG. 21. The press 50 comprises a first plate 51 and a second plate 52 for mounting the half molds. The second plate 52 is mounted in a fixed manner with respect to a frame, which is not shown. The first plate 51 is mounted such as to be able to move in translation on slides 56 along a longitudinal axis Z. The two plates 51 and 52 extend transversely to the axis Z.

Actuating means, which are not shown, such as hydraulic cylinders for example, allow the movement in translation of the first plate 51, in particular in the direction of the second plate 52. The pushing force of the actuating means of the first plate 51 against the second plate 52, with a view to closing the molds, is for example greater than 100 tonnes.

A first half mold 54 is mounted on the first plate 51 by way of a mounting plate 53 that pivots about the axis Z. A complementary mold 55 is mounted on the second plate 52. The complementary half mold 55 can be formed by a second half mold 55' and a third half mold 55", which are independent. The second and third half molds 55', 55" are positioned such that when the first plate 51 moves in translation in the direction of the second plate 52, the first half mold 54 faces and comes into contact with the second and third half molds 55', 55" in order to close the molds.

The first half mold 54 comprises a first set of identical cavities 60. A set of cavities should be understood as an identical cavity that can be repeated a certain number of times in order to create a plurality of identical components at the same time. A set of cavities can thus comprises a single cavity that makes it possible to create a single component at a time.

The second half mold 55' comprises a second set of cavities 61 and the third half mold 55" comprises a third set of cavities 62. The second and third sets of cavities 61 and 62 are positioned such that the first set of cavities 60 faces the second set of cavities 61 in a first angular position of the pivoting mounting plate 53 and faces the third set of cavities 62 in a second angular position of the pivoting mounting plate 53. For example, the two angular positions are at 180° to one another with respect to the axis Z, but other angles are also possible.

The press 50 also has a first feed hopper 57 and a second feed hopper 58, respectively containing the material for producing the support and the cosmetic product. These two materials are introduced into the hoppers at ambient temperature of around 20° C. for example in the form of solid granules.

Each hopper is connected to a feed device, which is not shown, for transforming the solid material in the hoppers into a fluid material and transferring this fluid material under pressure in the direction of the feed ducts 67, 68 respectively of the second and third sets of cavities 61 and 62. To this end, the feed device may comprise heating elements that make it possible to reach a temperature of the material of, for example, greater than 50° C. for the cosmetic product or greater than 100° C. for the thermoplastics materials, and pressurizing means such as an endless screw that makes it possible to inject the fluid material under pressure. The injection pressure of the material of the support 4 is for example greater than 500 bar. The injection pressure of the cosmetic product is for example greater than 10 bar, preferably between 15 bar and 20 bar, but may also be greater than 20 bar.

The feed ducts 67, 68 are kept at the injection temperature as far as the cavities in the mold, in order to prevent solidification of the material in said ducts.

The molds also comprise cooling circuits, which are not shown, for example for cooling by way of water, making it possible to lower the temperature of the cavities after injection of the material in order to cause solidification of the molded components. After cooling, the temperature of the cavity is for example less than 40° C., or even less than 30° C.

The steps of the manufacturing method are the following.

During a first step, the first half mold 54 is brought into contact with the second half mold 55' by the first mounting plate 51 being moved in translation in the direction of the second mounting plate 52. In this step, a first injection volume is formed by the first and second cavities 60 and 61. The first injection volume defines the volume corresponding to the support 4.

During a second step, illustrated in FIGS. 22 and 23, the material of the support 4 is injected through the injection duct 67 into the first injection volume. The quantity of material injected is less than 0.1 g, or even less than 0.05 g.

The single injection point of the support 4, at the end of the injection duct 67, is for example located at one end of the support, for example at the proximal part 31 or at the distal part 32 of the support 4. The injection can also be carried out through a plurality of different injection points.

The injection of the support 4 takes place at a temperature greater than 110° C. in order that the material of the support is fluid. The injection temperature is for example greater than 130° C. if the material used for the support is ABS, SAN or PE, or even greater than 165° C. if the material used is PP or POM.

Once injection is complete, the mold is then cooled to a temperature less than 100° C. in order that the support 4 solidifies.

Figure 24:
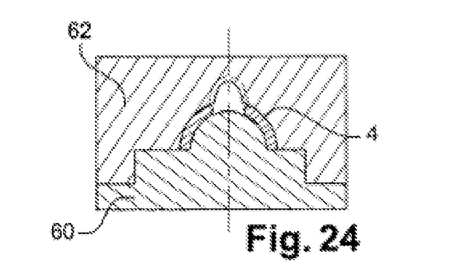
Figure 25:
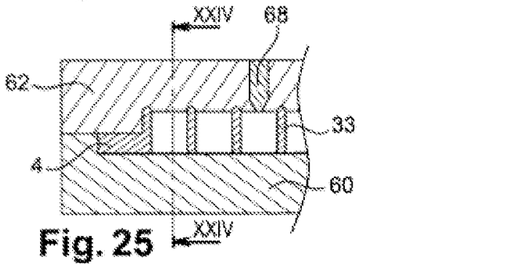

During a third step, illustrated in FIGS. 24 and 25, the mold is opened by the first mounting plate 51 being moved in translation in the opposite direction to the second mounting plate 52.

The supports 4 are not ejected and remain positioned in the first set of cavities 60 of the first half mold 54. The pivoting mounting plate 53 then rotates through 180°, making it possible to position the first set of cavities 60 holding the supports 4 opposite the third set of cavities 62. The mold is then reclosed by the first mounting plate 51 being moved in translation in the direction of the second mounting plate 52. In this step, a second injection volume is formed by the first and third sets of cavities 60 and 62.

Figure 26:
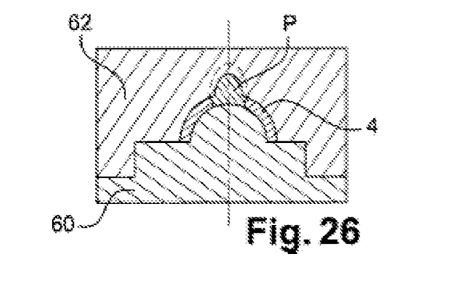
Figure 27:
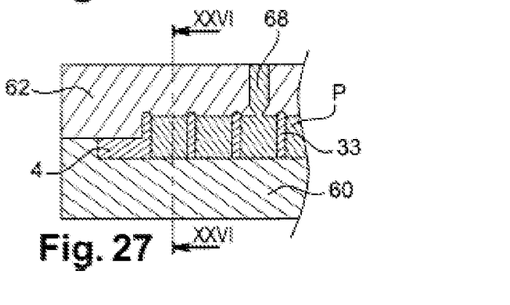

During the fourth step, illustrated in FIGS. 26 and 27, the cosmetic product P is injected onto the support 4 through the injection duct 68 into the second injection volume.

The quantity of cosmetic product injected is for example less than 1 g, or even less than 0.5 g, or even less than 0.1 g.

For example, each compartment may comprise around 0.05 g of cosmetic product.

The single injection point of the product P, at the end of the injection duct 68, is for example located at a compartment in the support 4. During the injection of the cosmetic product P into a compartment 34, the product also spreads into the other compartments via the grooves 35.

Preferably, when the support comprises an odd number of compartments, the injection point is located at the central compartment. In this way, the stresses of injection of the product P onto the support 4 are distributed symmetrically over the support.

The injection can also be carried out through a plurality of different injection points; for example the mold can have one injection point per compartment in the support.

The injection of the product P takes place at a temperature greater than 50° C. in order that the cosmetic product is fluid. It is important that the injection temperature of the cosmetic product is lower than that of the support in order that the support 4 does not melt again.

Once the injection of the cosmetic product is complete, the mold is cooled to a temperature less than 40° C. in order that the cosmetic product P solidifies on the support 4 in order to adhere to the latter and thus forms an application unit 100.

During a fifth step, the mold is opened by the first mounting plate 51 being moved in translation in the opposite direction to the second mounting plate 52.

The application units 100 are ejected from the mold by ejection means which are not shown. The pivoting mounting plate 53 then rotates through 180°, making it possible to position the first set of cavities 60 opposite the second set of cavities 61, as in the initial position of the first step.

The method then resumes the steps starting from the first and so on.

Alternatively, the first half mold 53 may comprise a second first set of cavities 60' identical to the first set of cavities 60 and located in this example symmetrically opposite, with respect to the axis Z, the first set of cavities 60, that is to say offset through 180° with respect to the axis Z.

In this way, it is possible to simultaneously carry out the same cycle as with the first set of cavities, offset by one injection.

Thus, during the first step, the second first set of cavities 60' forms with the third set of cavities 62 a second injection volume for the injection of the cosmetic product. It should be noted that, apart from the first injection cycle, the second first set of cavities 60' comprises the support 4 in this step.

Similarly, during the fourth step, the second first set of cavities 60' forms with the second set of cavities 61 a first injection volume for the injection of the support.

This method makes it possible advantageously both to form the application units 100 on a single press and also to be able to inject a set of supports and a set of application units 100 in parallel.

The same principle can be implemented when the application unit 100 comprises a plurality of cosmetic products, for example application units comprising two cosmetic products, as illustrated in FIG. 15, 16 or 20.

The first half mold 54 then comprises an additional, third first set of identical cavities 60", each first set of cavities 60, 60', 60" being for example offset from one another through 120° in rotation with respect to the axis Z.

The complementary half mold 55 comprises a third set of cavities 63, the sets of cavities of the complementary half mold 55 are located opposite the first sets of cavities 60, 60', 60" so as to engage with the latter to form a complete mold.

The press 50 then comprises an additional feed hopper 59, associated with a feed device, which is not shown, connected to a feed duct 69 in the direction of the third cavities 63.

An additional injection step is then provided and the rotation of the pivoting mounting plate 53 takes place in steps of 120°.

The implementation of the injection method on the above-described press can also be easily adapted by a person skilled in the art of injection to implementation on other types of injection presses, such as for example pivoting multiface presses, such as those described in the documents US2002101005 or WO2004103676. It may also be possible to inject both the cosmetic product and the material that forms the support simultaneously or virtually simultaneously in a single mold.

The supports 4, after having been loaded with product by the method described with reference to FIGS. 21 to 27, can be sold in packaging, for example a blister pack, comprising a plurality of application units 100 with or without an applicator 1. In the case where an applicator 1 is provided in the packaging, one application unit 100 may already be fixed to the applicator 1.

The application units may contain the same product or different products. The different products are for example different colors or have different properties. The different products proposed can for example result in makeup effects which are more or less full-bodied, and more or less lengthening.

In particular when the appearance of the products present on the corresponding supports does not allow the user to easily differentiate between them, the supports may be produced with identifiers for telling them apart. The supports may for example be produced in different colors, each color being associated with a corresponding product. The user can then choose the support in the color corresponding to the product which he or she wishes to apply.

Different supports provided to consumers can be packaged individually or alternatively in a common packaging. The supports may for example be present in strings, being for example linked together by bridges made of breakable material. This may make it easier to manufacture the application units.

The applicator can be provided to the consumer with the base and a plurality of application units. The base may in particular be provided within a single packaging with a plurality of identical application units or with a plurality of application units holding different products, and the user can then choose an application unit depending on the product which he or she wishes to use.

It is also possible to provide to the user, in particular within a single packaging, application units that are loaded or are not loaded with the same product but have different reliefs, for example comprising more or fewer projecting application elements or differently oriented ribs, in order for example to comb the eyelashes more or less during application and to produce a more or less full-bodied makeup.

The invention is not limited to the examples illustrated. The features of the various examples can in particular be combined as parts of variants which are not illustrated.

The expression "comprising a" should be understood as meaning "comprising at least one", unless specified to the contrary.

The invention claimed is:

1. A method for producing an application unit for applying a cosmetic product, the application unit comprising a support and a mass of a cosmetic product disposed on the support, the method comprising:
    injection molding the support of the application unit with a first material; and
    injection molding the cosmetic product onto the support, wherein the cosmetic product has a composition different than the first material that forms the support,
    wherein injection molding the support further comprises injecting the first material into a first injection volume to form the support, the first injection volume being defined in an injection mold, and
    wherein injection molding the cosmetic product further comprises:
        partially modifying the injection mold to obtain a second injection volume while retaining the support formed by injecting of the first material; and
        injecting the cosmetic product into the second injection volume.

2. The method of claim 1, wherein a temperature of the cosmetic product during injecting the cosmetic product is lower than a temperature of the support during injecting the first material to form the support.

3. The method of claim 1, wherein the cosmetic product is a first cosmetic product, the method further comprising:
    injecting a second cosmetic product into a third injection volume formed following partial modification of the injection mold that forms the second volume, while the support loaded with the first cosmetic product remains in the injection mold.

4. An application unit obtained by the method of claim 1, wherein the melting point of the cosmetic product is greater than 30° C. and less than the melting point of the first material that forms the support, the melting point of the first material that forms the support being greater than 100° C.

5. The application unit of claim 4, wherein the support includes a fixing site comprising one or more application elements or at least two receiving compartments that are separated from one another by one or more ribs.

6. The application unit of claim 4, wherein the support comprises a gripping member configured to permit holding the application unit as a cosmetic product applicator.

7. The application unit of claim 4, wherein the support is configured to be removably fixed to a receiving region of an applicator.

8. The method of claim 1, further comprising cooling the injection mold to allow the support to solidify following injecting the first material into the first injection volume to form the support.

9. The method of claim 1, wherein the support includes a fixing site, and wherein injection molding the cosmetic product onto the support includes injecting the cosmetic product on the fixing site of the support.

10. The method of claim 1, wherein injection molding the cosmetic product onto the support is performed at a temperature greater than 50° C.

11. The method of claim 1, further comprising cooling the injection mold following injecting the cosmetic product into the second injection volume.

12. The method of claim 1,
    wherein the second injection volume includes at least two receiving compartments separated by at least one rib, and
    wherein injecting the cosmetic product into the second injection volume includes injecting the cosmetic product into one of the at least two receiving compartments and directing the cosmetic product to the remaining of the at least two receiving compartments through one or more grooves formed in the support.

13. The application unit of claim 5, further comprising one or more grooves connecting the at least two receiving compartments, the one or more grooves directing the cosmetic product from one receiving compartment to another during injection molding of the cosmetic product.

14. The method of claim 3, wherein the second cosmetic product is injection molded onto the support in series with the first cosmetic product.

15. The method of claim 3, wherein the second cosmetic product is injection molded stacking on the first cosmetic product.

16. The method of claim 3, wherein the first cosmetic product is injection molded on a first frame of the support, and the second cosmetic product is injection molded on a second frame of the support, the first frame being separate from the second frame in a circular direction.

17. The application unit of claim 4, wherein the cosmetic product is a first cosmetic product, the application unit further comprising a second cosmetic product injection molded on the support.

18. The application unit of claim 17, wherein the second cosmetic product is injection molded onto the first cosmetic product, or onto the support in series with the first cosmetic product.

* * * * *